United States Patent
Kodama

(10) Patent No.: US 7,353,242 B2
(45) Date of Patent: Apr. 1, 2008

(54) FILE SERVER FOR LONG TERM DATA ARCHIVE

(75) Inventor: Shoji Kodama, San Jose, CA (US)

(73) Assignee: Hitachi, Ltd., Tokyo (JP)

( * ) Notice: Subject to any disclaimer, the term of this patent is extended or adjusted under 35 U.S.C. 154(b) by 264 days.

(21) Appl. No.: 10/886,646

(22) Filed: Jul. 9, 2004

(65) Prior Publication Data

US 2006/0010177 A1    Jan. 12, 2006

(51) Int. Cl.
*G06F 12/00* (2006.01)
*G06F 17/30* (2006.01)

(52) U.S. Cl. .................. 707/204; 707/10; 707/203; 707/205

(58) Field of Classification Search .............. 709/1, 709/212, 229; 707/8, 104.9, 200, 104, 203–205; 714/11; 711/114, 112; 365/189.05
See application file for complete search history.

(56) References Cited

U.S. PATENT DOCUMENTS

| | | | |
|---|---|---|---|
| 5,555,371 A | | 9/1996 | Duyanovich et al. |
| 5,974,503 A | * | 10/1999 | Venkatesh et al. .......... 711/114 |
| 6,016,553 A | | 1/2000 | Schneider et al. |
| 6,397,308 B1 | | 5/2002 | Ofek et al. |
| 6,434,681 B1 | | 8/2002 | Armangau |
| 6,434,683 B1 | | 8/2002 | West et al. |
| 6,460,055 B1 | | 10/2002 | Midgley et al. |
| 6,480,944 B2 | | 11/2002 | Bradshaw et al. |
| 6,507,890 B1 | * | 1/2003 | Morley et al. .............. 711/114 |
| 6,564,228 B1 | * | 5/2003 | O'Connor .................. 707/200 |
| 6,587,933 B2 | | 7/2003 | Crockett et al. |
| 6,625,750 B1 | * | 9/2003 | Duso et al. .................... 714/11 |
| 6,718,372 B1 | * | 4/2004 | Bober ......................... 709/217 |
| 6,931,450 B2 | * | 8/2005 | Howard et al. ............. 709/229 |
| 6,938,039 B1 | * | 8/2005 | Bober et al. .................... 707/8 |
| 2002/0083111 A1 | * | 6/2002 | Row et al. ...................... 709/1 |
| 2004/0098547 A1 | | 5/2004 | Ofek et al. |
| 2004/0186858 A1 | * | 9/2004 | McGovern et al. ......... 707/200 |

(Continued)

OTHER PUBLICATIONS

Santry, et al. "Deciding when to forget in the Elephant file system", 1999, Proceedings of the seventeenth ACM symposium on Operating Systems Principles, pp. 110-123.*

(Continued)

*Primary Examiner*—Charles Rones
*Assistant Examiner*—Charles D Adams
(74) *Attorney, Agent, or Firm*—Mattingly, Stanger, Malur & Brundidge, P.C.

(57) ABSTRACT

A NAS system including a NAS controller which processes file level input/output requests and controls the NAS system, and a storage apparatus having a controller which controls a storage device upon which plural volumes for storing data are represented. In the invention when at least a portion of data of a file stored on a volume is updated, the updated data is stored to an unused area of the volume, information is stored on the volume indicating that the updated data corresponding to original data stored in an original area is stored in the unused area so that subsequent accesses to the original of the updated data is directed to the updated data stored in the unused area, and the original of the updated data is retained in the original area, thereby implementing long term data archiving of the original of the updated data.

6 Claims, 12 Drawing Sheets

U.S. PATENT DOCUMENTS

2005/0044162 A1* 2/2005 Liang et al. ............... 709/212
2005/0226059 A1* 10/2005 Kavuri et al. ........... 365/189.05
2005/0240628 A1* 10/2005 Jiang et al. .............. 707/104.1
2006/0129761 A1* 6/2006 Guha et al. ............... 711/114

OTHER PUBLICATIONS

EMC Centera, Centera Content Addressed Storage, Product Description Guide, $EMC^2$ where information lives, pp. 1-19.
SnapLockTM Compliance and SnapLock Enterprise Software, Storage Solutions NetApp, pp. 1 and 2.

* cited by examiner

| inode# | 1 | |
|---|---|---|
| File Size | 21GB | |
| Created Time | 00:00:00AM, July 1, 1973 | |
| Last Modified Time | 05:00:00AM, November 28, 1973 | |
| Last Accessed Time | 10:20:00AM, April 7, 2002 | |
| Owner | Kodama | |
| Permission/ACL | Read / Write / Delete | |
| #1 | Volume 1 | Disk Block 1 |
| #2 | Volume 1 | Disk Block 2 |
| #3 | Volume 1 | Disk Block 3 |
| #4 | Volume 1 | Disk Block 4 |
| #5 | Volume 1 | Disk Block 5 |
| #6 | Volume 1 | Disk Block 6 |

| Physical Volume | File System | Allocated | Remaining Period | WORM Enabled | Retention Period |
|---|---|---|---|---|---|
| 1 | FS1 | Yes | 325 days | Yes | 3yr |
| 2 | FS1 | Yes | - | No | - |
| 3 | FS2 | Yes | 12 days | Yes | - |
| 4 | FS3 | Yes | - | No | - |
| 5 | - | No | - | Yes | - |
| 6 | - | No | - | - | - |

FILE SERVER FOR LONG TERM DATA ARCHIVE

BACKGROUND OF THE INVENTION

The present invention relates generally to techniques for long term data archiving in a storage system. More particularly the present invention relates to a file server or network attached storage (NAS) system and method for implementing long term data archiving.

Conventionally, long term data archiving has been accomplished using write once read many (WORM) storage media. Recently the need for long term data archiving has increased. This need has been made more acute, for example, by the passage of various regulations. These regulations include, for example, Regulations like SEC (Securities and Exchange Act) and 21 CFR (Code of Federal Regulations) Part 11 of the Food and Drug Administration (FDA) act. These regulations require regulated companies to protect regulated data and to retain the regulated data for long periods, such as, 7 years in the case of SEC regulations. Regulations in some industries don't allow people to modify any stored data if the data is in fact regulated data. Another important factor in such regulations is the requirement that the data be allowed to be modified during the retention period.

Traditional file servers or NAS appliances don't meet the above described regulations. File servers or NAS appliances or file systems in operating systems are commonly used for storing files into storage medium. Hard disk drives have been and are being used as such storage medium. As is well known data stored on hard disk drives can be easily modified. Thus, hard disk drives do not in and of themselves meet the above described regulations.

Conventional NAS and Content Addressed Storage (CAS) provide WORM capability. However, conventional NAS and CAS products that provide this capability do not allow any modification of data stored once it has been stored therein.

For example, the NAS Filer products of Network Appliance, Inc. provide what is described as a SnapLock (Trademark of Network Appliance Inc.) function. "SnapLock Compliance and SnapLock Enterprise Software", Network Appliance, Inc. 2003. This function allows a user to specify a file that needs to be protected and a retention period for the file. After a WORM bit has been set for a specified file by applications, the Filer does not allow any user to modify or delete the specified file until the retention period has expired.

As described above there is a requirement to allow for the modification of a protected file during a retention period. To accomplish such according to the NAS SnapLock function, a user is required to copy the file to another volume or filer and then protect the copied file using the SnapLock function. This allows the original file to be modified. However, this procedure requires several steps and as such is inconvenient to the user particularly which numerous file are involved.

Further, for example, the CAS Centera (Trademark of EMC Corporation) products of EMC Corporation provide a specialized storage to store fixed contents. "Centera Content Addressed Storage: Product Description Guide", EMC Corporation 2003. Once data has been stored in a Centera storage, the Centera storage does not allow users to modify or delete the data until the specified retention period has expired. There is no way to modify the stored data.

The same as NAS, there is a requirement to allow for the modification of a protected file during a retention period. To accomplish such according to the CAS Centera storage, a modified file is stored as a different file with a different ID. The CAS Centera storage also stores the original file. However, as per the CAS Centera storage the user is required to manage both files and IDs. This additional task represents an inconvenience to the user.

SUMMARY OF THE INVENTION

The present invention provides an apparatus, method and system, particularly, for example, a file server or Network Attached Storage (NAS) system for implementing long term data archiving.

The present invention provides, for example, a NAS system for implementing long term data archiving. The NAS system includes a NAS controller which processes file level input/output (I/O) requests and controls the NAS system, and a storage apparatus having a controller and a storage device, controlled by the controller, upon which a plurality of volumes for storing data are represented.

According to the present invention when a file is created, data of the file on a volume is protected by using a function of the controller and the storage device. When at least a portion of data of a file stored on a volume is updated, the updated data is stored to an unused area of the volume and the portion of the data is protected by using the function of the controller and the storage device. Information is also stored on the volume indicating that the updated data corresponding to original data stored in an original area is stored in the un-used area so that subsequent accesses to the original of the updated data is to the updated data stored in the un-used area. The original of the updated data is retained in the original area and protected. Thus, by use of the present invention long term data archiving of the original of the updated data is implemented.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto, wherein in the following brief description of the drawings:

DETAILED DESCRIPTION OF THE INVENTION

The present invention as will be described in greater detail below provides an apparatus, method and system, particularly, for example, a file server or Network Attached Storage (NAS) system for implementing long term data archiving. The present invention provides various embodiments as described below. However it should be noted that the present invention is not limited to the embodiments described herein, but could extend to other embodiments as would be known or as would become known to those skilled in the art.

Figure 1:
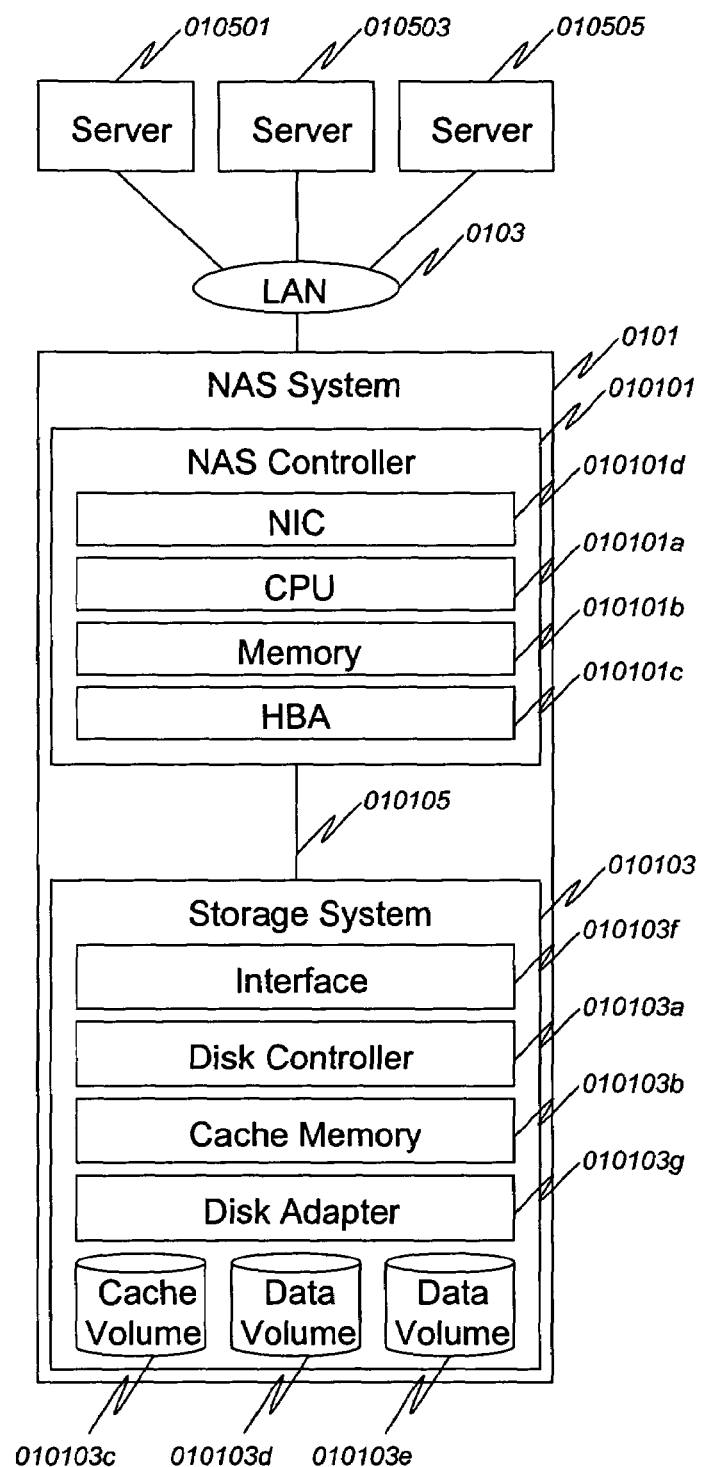
FIG. 1 is a diagram for explaining a NAS system according to a first embodiment of the present invention.

The present invention operates in a system having a configuration such as that illustrated in FIG. 1. The system includes a plurality of servers 010501, 010503 and 010505, a local area network (LAN) 0103, and a NAS system 0101.

Each server 010501, 010503 and 010505, can for example, be a computer on which applications are running. A Network File System (NFS) client, sitting under a Virtual File System (VFS) layer of an operating system of the server 010501, 010503 and 010505, provides applications with file access to the NAS system 0101 via the LAN 0103. The NFS is a file sharing protocol between the servers 010501, 010503 and 010505 and the NAS system 0101 and is used, for example, with UNIX and Linux servers. Alternatively the client could be a Common Internet File System (CIFS) client which is essentially the same as the NFS client with the exception that CIFS is a file sharing protocol for Windows servers. Other such file sharing protocols can be used. For example, Object-based Storage Device (OSD) and File Transfer Protocol (FTP) can be used.

The LAN 0103 is a network which connects servers 010501, 010503 and 010505 and the NAS system 0101. The physical network for the LAN 0103 could, for example, be an Ethernet upon which Transport Control Protocol (TCP)/Internet Protocol (IP) is used as a communication protocol. The physical network could also be InfiniBand, Fibre Channel or any other such communication protocol now known or that may become known.

The NAS system 0101 is a storage in which files containing data are stored. The NAS system 0101 supports NFS and CIFS protocols to communicate with servers 010501, 010503 and 010505.

The internal hardware of NAS system 0101 includes at least one NAS controller 010101 and at least one storage apparatus (system) 010103. The NAS controller 010101 and storage system 010103 are connected in order to communicate with each other. The NAS controller 010101 and storage system 010103 can be connected via a Fibre Channel (FC) network 010105. Alternatively a FC switch, Ethernet or any other such network can be used to connect the NAS controller 010101 and the storage system 010103. The NAS controller 010101 and an interface 010103f of a storage system 010103 and a disk controller 010103a of the storage system 010103 can be embedded on a board. In this case an electronic circuit connects the NAS controller 010101 and the interface 010103f of the storage system 010103.

The NAS Controller 010101 includes at least one central processor unit (CPU) 010101a, at least one memory 010101b, at least one Network Interface Card (NIC) 010101d and at least one Host Bus Adapter (HBA) 010101c. The CPU 010101a and the memory 010101b are used for running an operating system and software for the NAS controller 010101. The NIC 010101d is used for communicating with the servers 010501, 010503 and 010505 via the LAN 0103. The HBA 010101c is used for accessing the storage systems 010103.

The storage system 010103 includes at least one interface 010103f (ex. Fibre Channel interface), at least one disk controller 010103a, at least one cache memory 010103b, at least one disk adapter 010103g and at least one volume 010103c, 010103d, 010103e. Interface 010103f is used for communicating with the NAS controller 010101. The disk controller 010103a processes I/O requests and other management requests from the servers 010501, 010503 and 010505. A cache memory 010103b is provided for temporarily storing data for faster access. The disk controller 010103a communicates with the volumes 010103c-e to read and write data in the volumes 010103c-e.

Each volume 010103c-e stores data and can be a logical storage which includes multiple physical disk drives configured with Redundant Array of Independent Disks (RAID) or one physical disk drive. Each volume could also be provided by an external storage wherein, for example a parent storage system connects to other child storage systems via a network and the parent storage system reads and writes data in the child storage systems. Additionally each of the volumes could be provided by, for example, a digital video disk (DVD) or a compact disk (CD).

According to the present invention there are two types of volumes, cache volumes 010103c and data volumes 010103d, 010103e. Differences between these volumes will be explained below.

Figures 2, 3:
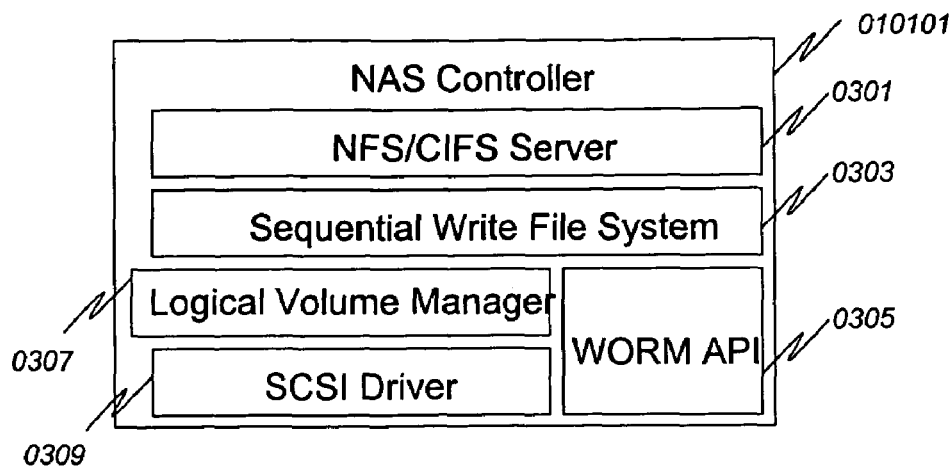
FIG. 2 is a diagram for explaining the Software Modules inside the NAS Controller as per FIG. 1 according to the present invention.
FIG. 3 is a diagram for explaining an example of inode information according to the present invention.

FIG. 2 illustrates the internal software of the NAS controller 010101. In the NAS controller 010101 various functions are performed by executing various software products including, for example, a NFS/CIFS server 0301, a Sequential Write File System (SWFS) 0303, a Logical Volume Manager 0307, a SCSI driver 0309 and a WORM Application Programming Interface (API) 0305.

The NFS/CIFS server 0301 processes NFS and CIFS protocols. These protocols may be embodied in I/O requests received by the NFS/CIFS server 0301 from the servers 010501, 010503 and 010505 via the LAN 0103. The NFS/CIFS server 0301 processes the requests and if necessary, creates, deletes, reads and writes files which are managed by the SWFS 0303 by using a Virtual File System (VFS) interface (not shown). The VFS interface provides APIs for use by the NFS/CIFS server 0301 to access files.

The SWFS 0303 is a file system under the VFS layer in an operating system of NAS controller 010101. The SWFS 0303 processes file I/O requests issued by NFS/CIFS server 0301 through the VFS layer. The SWFS 0303 stores files in the volumes 010103c-e of the storage system 010103. Details of how SWFS 0303 works is explained below.

Logical Volume Manager 0307 provides a logical volume for applications including a file system. A logical volume as described above can include one or more physical disk drives which are accessed by a server 010501, 010503 and 010505 via the LAN 0103.

The SCSI driver is software that provides low level data access to the volumes 010103c-e in the storage system 010103 for the SWFS 0303. To read and write data in a volume 010103c-e the SWFS 0303 specifies a name or ID of a volume 010103c-e, an offset from which data is read or written and a size of data that the SWFS 0303 wants to read or write.

The WORM API 0305 provides a way for the SWFS 0303 to set and get retention information of each volume 010103c-e in the storage system 010103, thereby protecting the volume 010103c-e from subsequent write operations or any other such modifications to the volume 010103c-e according to the set retention period. An example of a format of the WORM API is as follows:

```
# Set a retention period for a volume
    set_retention_period ([input]volume_id, [input]retention_period)
        volume_id: a name or ID of a volume
        retention_period: how long a volume needs to be write-protected
from a present time
# Get a retention period which has been set on a volume
    get_retention_period ([input]volume_id, [output]retention_period)
        volume_id: a name or ID of a volume
        retention_period: how long a volume is being write-protected from
a present time
```

The SWFS 0303 works similar to many other file systems with the following exceptions: (1) the SWFS 0303 never overwrites a file stored in a data volume 010103d-e once the file is written to the data volume 010103d-e; (2) If a file stored in a data volume 010103d-e needs to be modified, the SWFS 0303 keeps the original file in the data volume 010103d-e and writes a modified file to another un-used location in the data volume 010103d-e; (3) the SWFS 0303 writes data from the first offset of a volume to the last offset sequentially; (4) Once a data volume 010103d-e is filled with data, the SWFS 0303 protects the volume by using the WORM API 0305 and uses another data volume 010103d-e to write another data or update data; and (5) If a retention period set to a data volume 010103d-e has been expired, it is a user's decision if the user wants to keep or delete files stored in the data volume 010103d-e. Additional details of the SWFS 0303 will be described below.

FIG. 3 illustrates an inode 05 according to the present invention. Inodes are data structures that, for example, contain information about files in a file system. Each file has an inode and is identified by an inode number (i-number) in the file system where it resides. inodes provide important information on files in the file system. Inodes are created when a file system is created. There are a set number of inodes, which indicate the maximum number of files the system can hold. A file's inode number can be found using the ls-i command, while the ls-l command will retrieve inode information. The SWFS 0303 manages an inode for each file and directory. As illustrated in FIG. 3 the inode 05 has two parts, namely basic information about a file and data allocation information of the file.

The Basic information includes inode # 0501, file size 0503, created time 0505, last modified time 0507, last accessed time 0509, owner 0511, and permission/Access Control List (ACL) 0513. The Inode # 0501 is an identification of the inode 05 in the file system. File size 0503 is the size of the file. Created time 0505 is the time at which the file was created. The last modified time 0507 is time at which the file was modified. The last accessed time 0509 is the time at which the file was last accessed. Owner 0511 is the user who created the file. Permission/ACL 0513 is information to be used for restricting user's access to the file.

The data allocation information 0515 to 0525 manages information as to which disk block a file is stored in. As known a volume is divided to multiple disk blocks. The SWFS 0303 specifies disk blocks to store data. A file may be larger than a disk block. In this case, a file is divided by a size of a disk block and stored to multiple disk blocks. Thus, the data allocation information of inode 05 manages a list of disk blocks in which a file is stored. Therefore, as illustrated in FIG. 3, a file is stored in disk blocks #1, 2, 3, 4, 5 and 6 of Volume 1 in the order indicated.

As described above the present invention provides a cache volume 010103c and data volumes 010103d-e. Each data volume 010103d-e is a volume in which files are stored. The cache volume 010103c is used for storing files temporary. While a file is opened and continues to be modified, any updated data is stored in the cache volume 010103c. After the file is closed, the updated data is moved to a data volume 010103d-e. The inode for the file which is opened, modified and ultimately stored must track the location of the most recent version of the file so as to properly direct all accesses to the file to its most recent version. This feature of the present invention is illustrated for example in FIG. 4.

Figure 4:
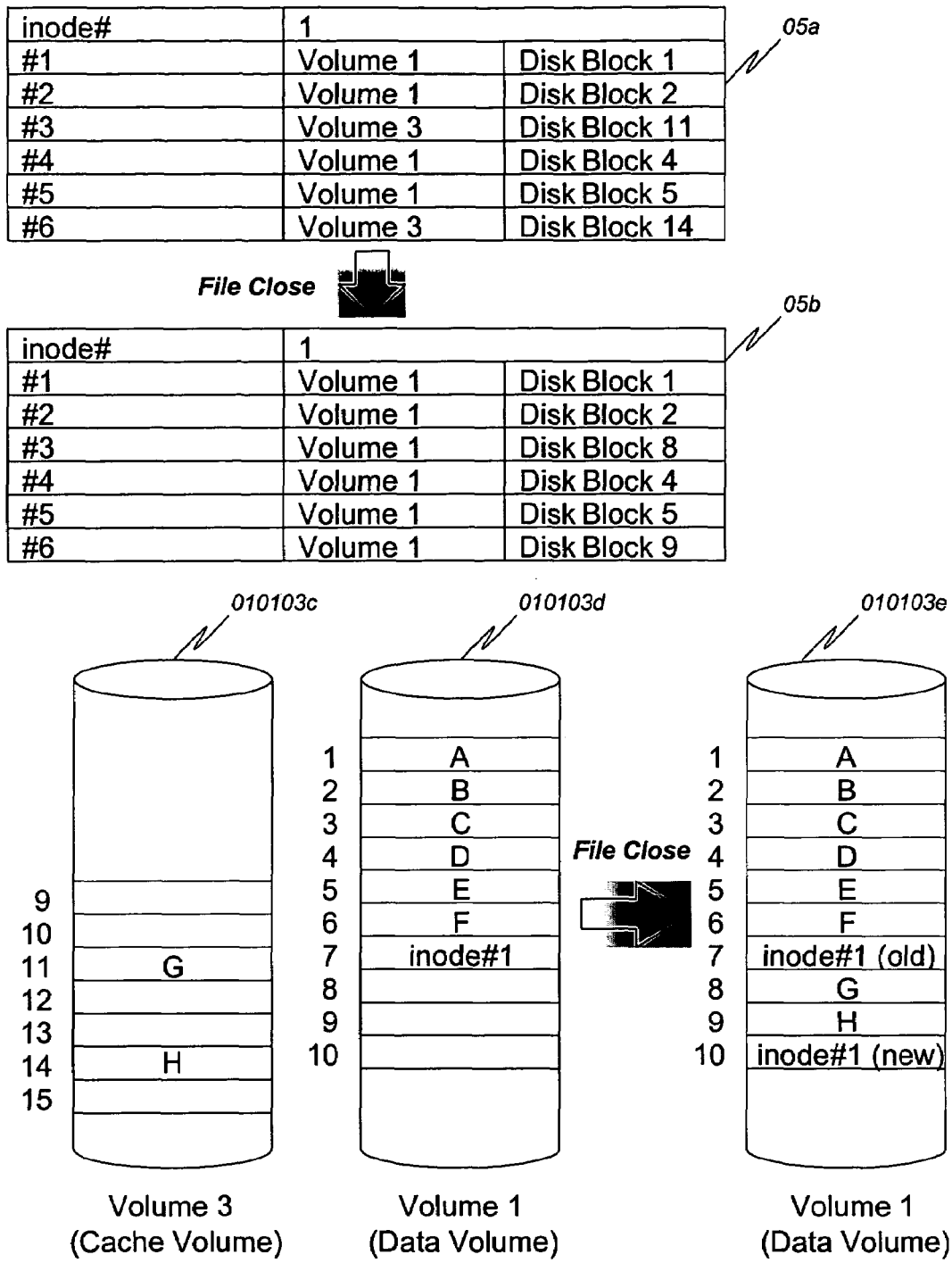
FIG. 4 is a diagram illustrating an example of a File Write & Close procedure according to the present invention.

When the file as represented by inode 05 in FIG. 3 is accessed a copy of the file is stored in the cache volume 010103c. Thereafter, all accesses to the file are made to the cache volume 010103c. When data C and F at disk blocks 3 and 6, respectively, are modified (updated), the updated data G and H are stored in the corresponding disk blocks 11 and 14 of the cache volume 010103c as illustrated in FIG. 4. In order to permit subsequent access to the updated data G and H in the cache volume 010103c, the location of the updated data G and H in the cache volume 010103c is reflected by modifying the inode to have contents, such as, inode 05a illustrated in FIG. 4. Inode 5a is the state of the inode prior to file close. Thus, for data C and F at disk blocks 3 and 6, respectively, inode 5a indicates that the updated data G and H is stored in disk blocks 11 and 14, respectively, of the cache volume 010103c.

Upon closing the file represented by inode 05, now having the contents as per inode 05a, the updated data G and H are stored to unused areas, disk blocks 8 and 9, respectively, of the data volume 010103d-e and the inode is modified to have contents, such as, inode 05b illustrated in FIG. 4. Thus, for data C and F of disk blocks 3 and 6, respectively, inode 05b indicates that the updated data G and H is stored in disk blocks 8 and 9, respectively of the data volume 010103d-e.

According to the present invention, so as to implement long term data archiving, the original data C and F and the original (old) inode 05 are retained. Further, according to the present invention updated data G and H are stored in the unused area and the modified (new) inode 05*b* is stored, for example, in another unused area disk block 10 of the data volume 010103*d-e*.

Figure 5:
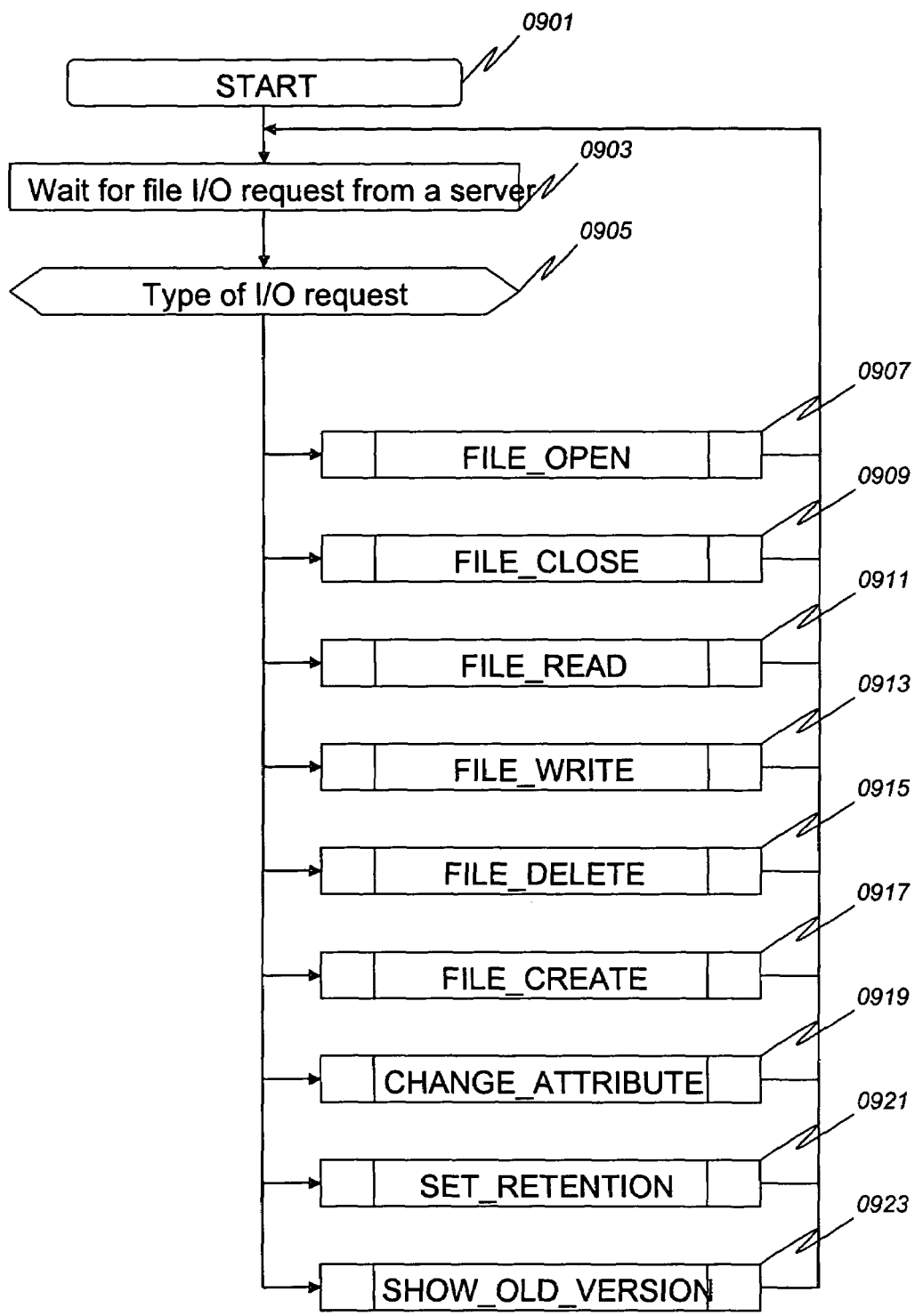
FIG. 5 is a flowchart illustrating the steps performed when executing a Sequential Write File System (SWFS) according to the present invention.

The steps performed by the SWFS 0303 are illustrated in FIG. 5. SWFS 0303 waits for a file I/O request from NFS/CIFS server 0301 via VFS interfaces (Step 0903). The SWFS 0303 checks what type of file I/O request the received file I/O request is (Step 0905). Depending on the type of file I/O request the steps corresponding to one of the following requests are executed: (1) FILE_OPEN request wherein a specified file is opened (Step 0907); (2) FILE_CLOSE request wherein a specified file is closed (Step 0909); (3) FILE_READ request wherein data is read from a specified file (Step 0911); (4) FILE_WRITE request wherein data written to a specified file (Step 0913); (5) FILE_DELETE request wherein a specified file is deleted (Step 0915); (6) FILE_CREATE request wherein a file is created (Step 0917); (7) CHANGE_ATTRIBUTE request wherein basic information in an inode of a specified file is changed (Step 0919); (8) SET_RETENTION request wherein a retention period is set to a specified file system (Step 0921); and (9) SHOW_OLD_VERSION request wherein older versions of a specified file are provided (Step 0923).

Figure 6:
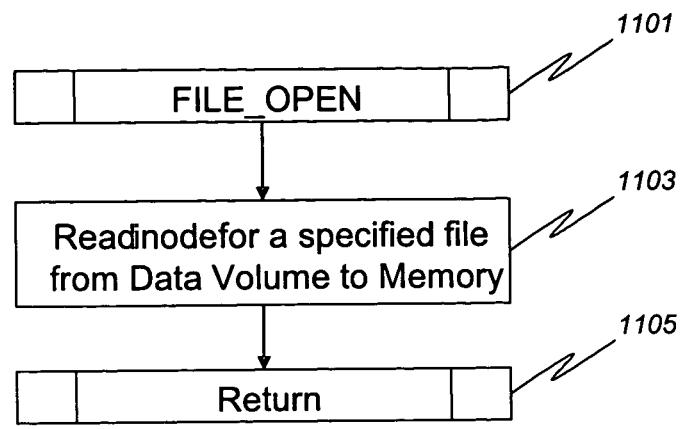
FIG. 6 is a flowchart illustrating the steps executed to perform a File Open Request according to the present invention.

FIG. 6 illustrates the details of the FILE_OPEN request (Step 0907). As illustrated in FIG. 6 the SWFS reads an inode of a specified file from a current data volume into the memory of the NAS controller (Step 1103). The SWFS returns a file descriptor (FID) as a reference for this opened file to NFS/CIFS server and then returns to Step 0903 (Step 1105). The NFS/CIFS server uses the FID to specify the opened file afterwards.

Figure 7:
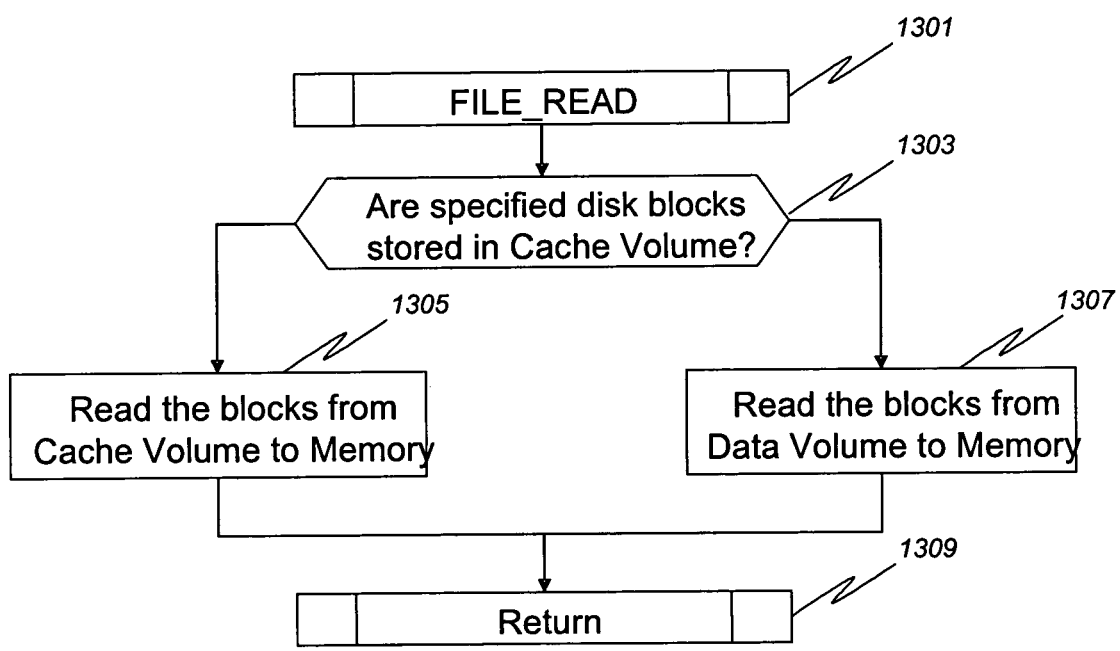
FIG. 7 is a flowchart illustrating the steps executed to perform a File Read Request according to the present invention.

FIG. 7 illustrates the details of the FILE_READ request (Step 0909). As illustrated in FIG. 7 the SWFS checks if a requested area in the specified file is stored in a cache volume or a data volume by looking at data allocation information of the inode (Step 1303). If the requested area is stored in the cache volume, then the SWFS reads data from the cache volume to the memory of the NAS controller (Step 1305) and then returns to Step 0903 (Step 1309). The NFS/CIFS server specifies a location in the memory to store read data. If the requested area is stored in the data volume, then the SWFS reads data from the data volume to memory of the NAS controller (Step 1307) and then returns to Step 0903 (Step 1309).

Figure 8:
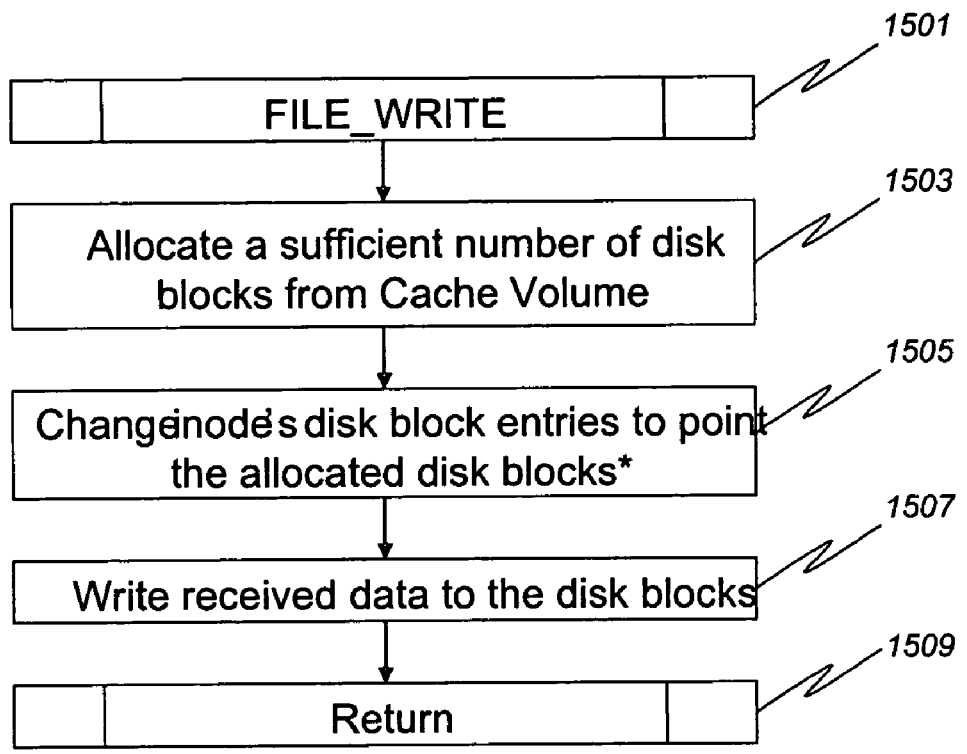
FIG. 8 is a flowchart illustrating the steps executed to perform a File Write Request according to the present invention.

FIG. 8 illustrates the details of the FILE_WRITE request (Step 0911). As illustrated in FIG. 8 the SWFS allocates a sufficient number of un-used disk blocks in the cache volume in order to store the received data (Step 1503). The SWFS manages allocations of disk blocks for both cache volumes and data volumes by using bitmap tables. The SWFS changes/modifies the data allocation information of the inode so that the inode points to these new disk blocks (Step 1505). In this step, only the inode stored in memory (e.g. cache memory, registers, etc.) is changed. The Inode stored on a data volume is not changed at this time. When a file is closed, the modified inode is stored from the memory to the data volume. The SWFS writes the received data to the new disk blocks (Step 1507) and then returns to Step 0903 (Step 1509).

Figure 9A:
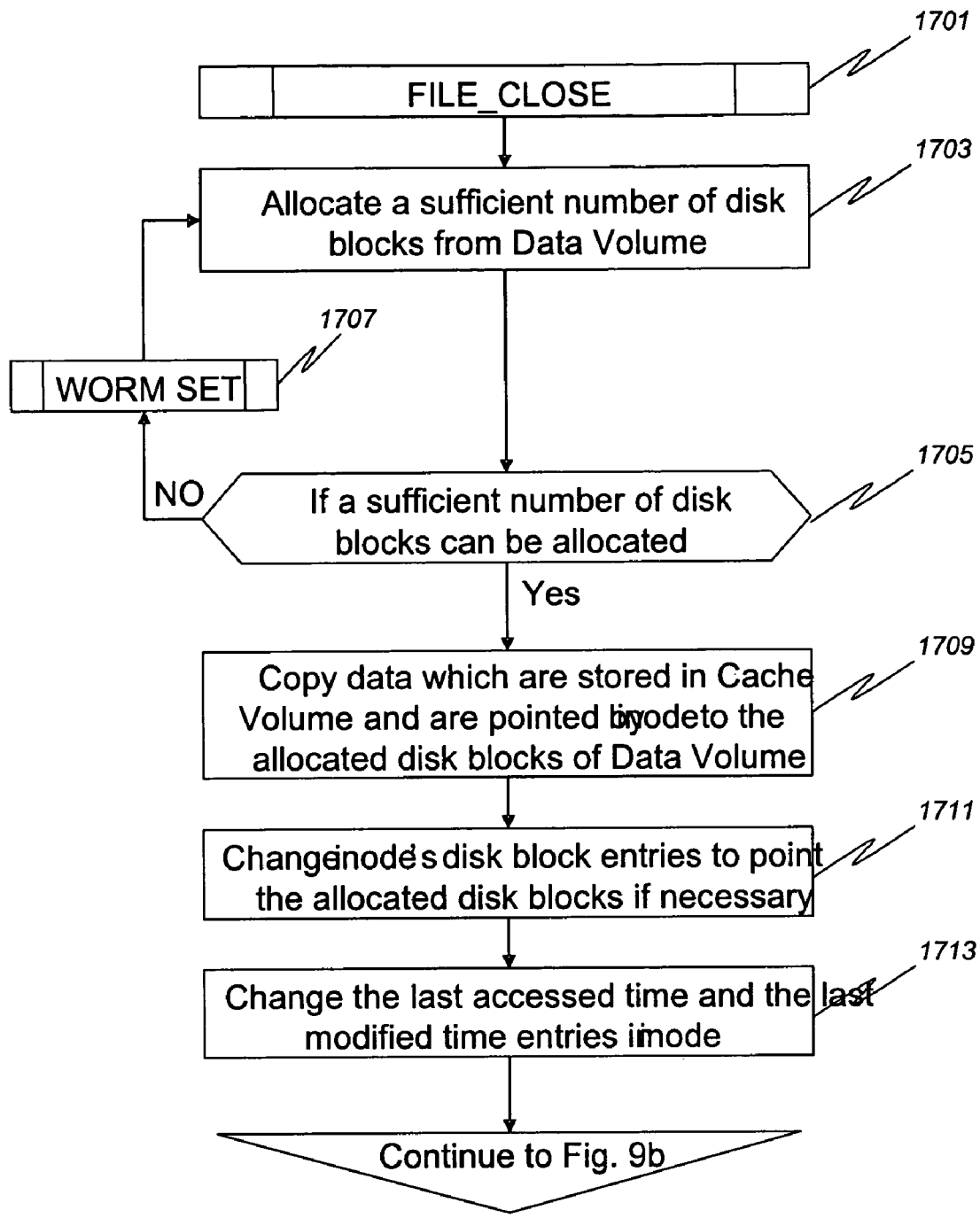
FIGS. 9a and b are flowcharts illustrating the steps executed to perform a File Close Request according to the present invention.
Figure 9B:
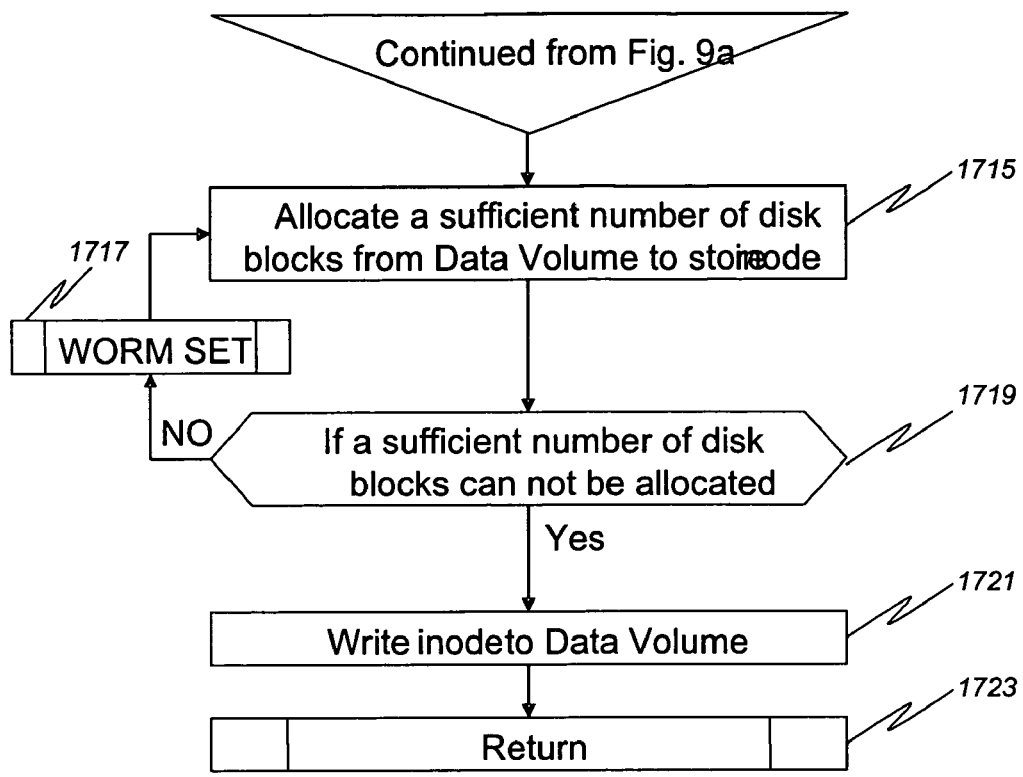

FIGS. 9*a* and *b* illustrate the details of the FILE_CLOSE request. As illustrated in FIG. 9*a* the SWFS allocates a sufficient number of un-used disk blocks in a data volume in order to store updated data in a cache volume (Step 1703). If the SWFS can not allocate a sufficient number of disk blocks, meaning the data volume is full, then the SWFS executes WORM_SET request and tries the allocation again (Steps 1705 and 1707). If the SWFS can allocate a sufficient number of disk blocks, then the SWFS copies data which are stored in the cache volume and pointed to by the inode to the allocated disk blocks in the data volume (Step 1709). Thereafter, the SWFS changes/modifies the data allocation information of the inode so that the inode points to these disk blocks (Step 1711). In this step, only the inode stored in memory is changed. The Inode stored on a data volume is not changed at this time. The SWFS changes the last accessed time of the inode and the last modified time entries (Step 1713). In this step, only the inode stored on a memory is changed. The inode stored on a data volume is not changed at this time. As illustrated in FIG. 9*b* the SWFS allocates a sufficient number of un-used disk blocks in a data volume in order to store the inode (Step 1715). If the SWFS can not allocate a sufficient number of disk blocks, then the SWFS, then the SWFS executes a WORM_SET request and tries allocation disk blocks again (Step 1719). The SWFS writes the inode to the allocated disk blocks in the data volume (Step 1721). According to this step the modified inode is stored to a data volume. Thereafter, the request returns to Step 0903 (Step 1723).

Attention is directed to FIG. 4 as an example of the steps performed when closing a file. As illustrated before a file is closed, some parts #1, 2, 4, and 5 of a file are stored in a data volume and the other parts #3 and 6 of the file are stored in a cache volume. The Inode shows such status wherein the parts #3 and 6 have been modified and therefore was stored in the cache volume. After the file has been closed, data in parts #3 and 6 are moved to the data volume. When the parts #3 and 6 are moved to the data volume, new disk blocks in the data volume (Disk Blocks 8 and 9) are allocated. Thereafter, data allocation information of the inode is modified. The un-used disk block #10 in the data volume is used for storing the inode.

Figure 10:
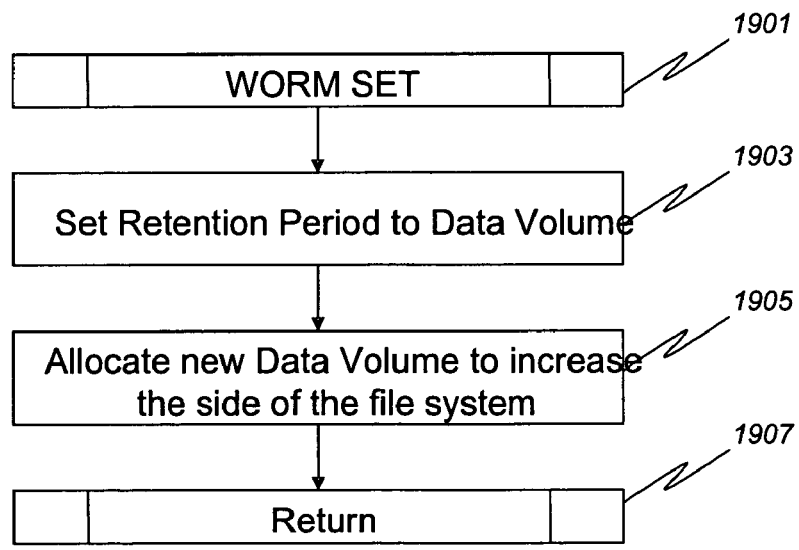
FIG. 10 is a flowchart illustrating the steps executed to perform a WORM SET request according to the present invention.

FIG. 10 illustrates the details of the WORM_SET request (Step 1707 and 1717). As illustrated in FIG. 10 the SWFS sets a retention period for the data volume that the SWFS is currently using by using WORM API (Step 1903). A disk controller of a storage system that has the data volume processes the request to set the retention period. Until the retention time has expired, the disk controller does not allow any modification of data stored in the volume. When the disk controller receives a write request from the NFS/CIFS server, the disk controller ignores the request or returns an error to the NFS/CIFS server. The retention period is specified by the NFS/CIFS server or a management software tool of the NAS system. The NFS/CIFS server and the management software use a proprietary API of the SWFS in order to set retention period information for file systems or data volume. A SET_RETENTION request is called to set the retention period and the SWFS processes the request. This is explained below with respect to FIG. 14. The retention period information is managed by a retention period table 29 as illustrated in FIG. 15.

Figures 15, 16:
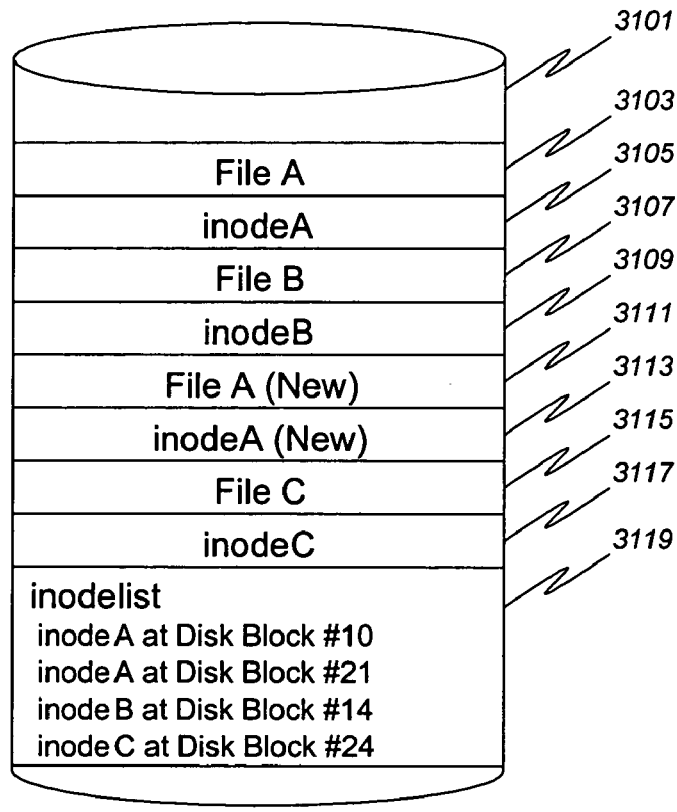
FIG. 15 is a diagram illustrating a Retention Period Table according to the present invention.
FIG. 16 is a diagram illustrating an example of an inode list in a data volume according to the present invention.

The retention period table as illustrated in FIG. 15 has 6 columns, namely physical volume 2901, file system 2903, allocated 2905, remaining period 2907, WORM enabled 2909, and retention period. The physical volume 2901 shows a list of data volumes that the NAS controller can access. The file system 2903 shows a name of a file system to which data volumes are allocated. One file system can use multiple data volumes. Data volumes are concatenated. The logical volume manager can be used for this request. The allocated 2905 column indicates if a data volume is allocated to a specific file system or is free. The remaining period 2907 indicates the amount of time remaining in the retention period for a data volume. When the data volume is filled with data, the data volume is write-protected. WORM enabled 2909 indicates whether the data volume is write-protected or not. The retention period 2911 indicates the amount of time the data is to kept unchanged. The SWFS allocates a new data volume which is not used for any file system in order to increase a capacity of a file system (Step 1905) as illustrated in FIG. 10. Thereafter the request returns to Step 0903 (Step 1907). Thus, the SWFS manages data volume allocations by using retention period table (29).

Figure 11:
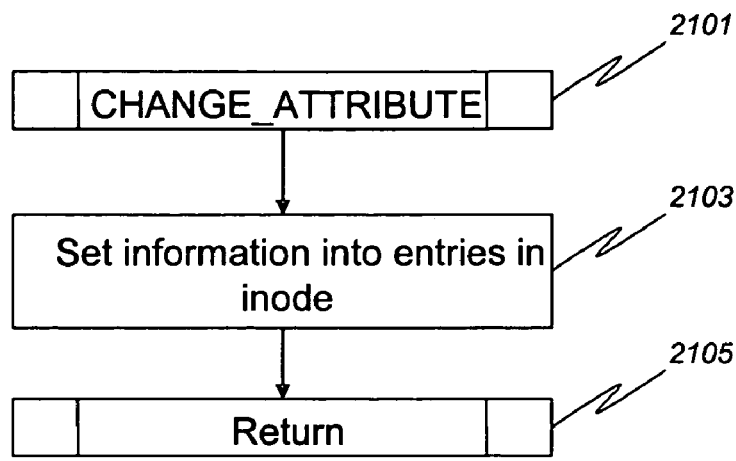
FIG. 11 is a flowchart illustrating the steps executed to perform a Change Attribute Request according to the present invention.

FIG. 11 illustrates the details of the CHANGE_ATTRIBUTE request (Step 0919). As illustrated in FIG. 11 the SWFS sets received information to basic information entries of an inode (Step 2103). Thereafter the request returns to Step 0903 (Step 2105).

Figure 12:
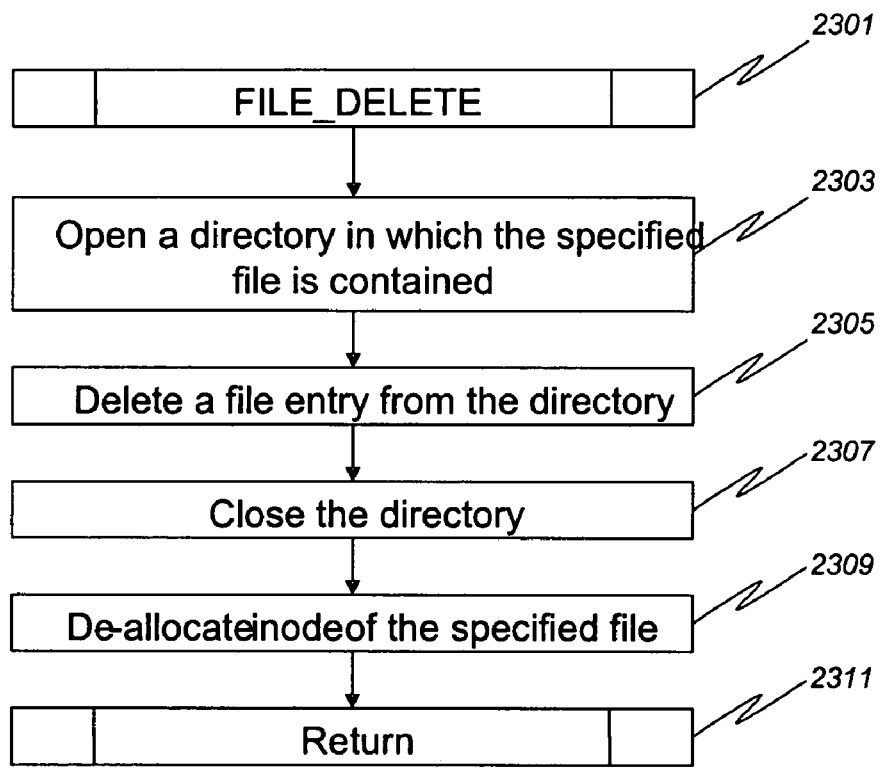
FIG. 12 is a flowchart illustrating the steps executed to perform a File Delete Request according to the present invention.

FIG. 12 illustrates the details of the FILE_DELETE request (Step 0915). As illustrated in FIG. 12 the SWFS opens a directory in which the specified file is contained (Step 2303). A directory is a special type of a file. A directory file is a table that manages a list of file names which are located in the directory and inodes for these files. Creating a file means adding a new entry in the directory file. Deleting a file means deleting an entry from the directory. Creating or deleting a file requires changing a directory in which the file is located. However, this change does not affect an upper level directory of the modified directory. The SWFS uses its own request to open, read, write and delete the directory. The SWFS deletes an entry for a specified file from the opened directory (Step 2305). Because the SWFS modifies the directory, the modification is stored in un-used disk blocks in the data volume because the SWFS does not allow any overwriting of data, not only with respect to files but also directories. The SWFS closes the directory (Step 2307). The SWFS de-allocates the inode of the specified file (Step 2309). Thereafter the request returns to Step 0903 (Step 2311).

Figure 13:
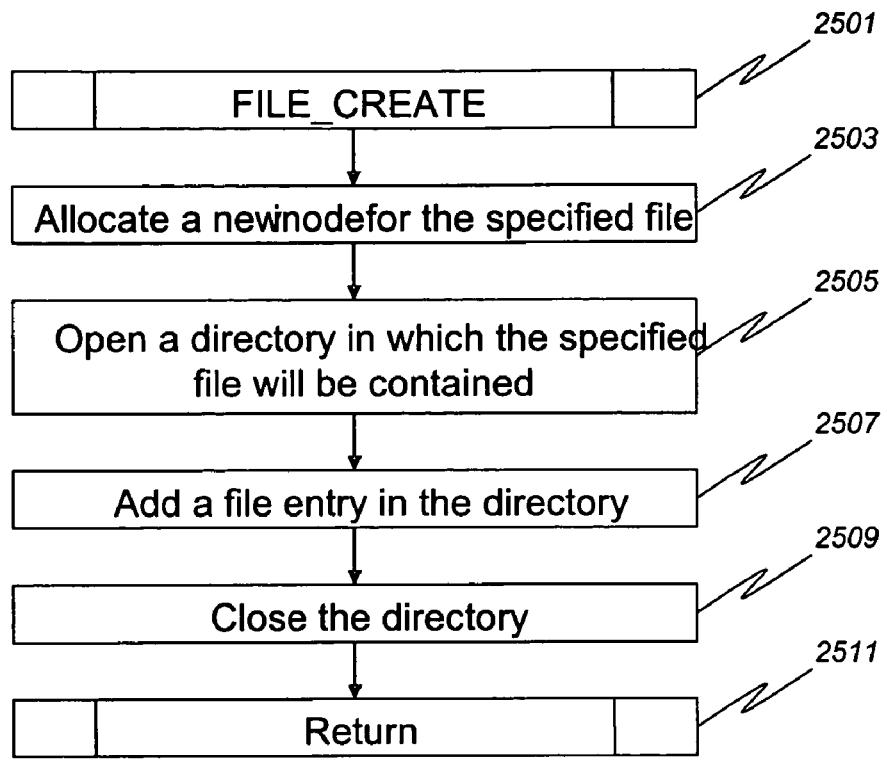
FIG. 13 is a flowchart illustrating the steps executed to perform a File Create Request according to the present invention.

FIG. 13 illustrates the details of the FILE_CREATE request (Step 0917). As illustrated in FIG. 13 the SWFS allocates a new inode which is not used for any file (Step 2503). The SWFS opens a directory in which the specified file will be located (Step 2505). The SWFS adds a new entry for the specified file and the allocated inode in the opened directory file (Step 2507). The SWFS closes the directory file (Step 2509). Thereafter the request returns to Step 0903 (Step 2511).

Figure 14:
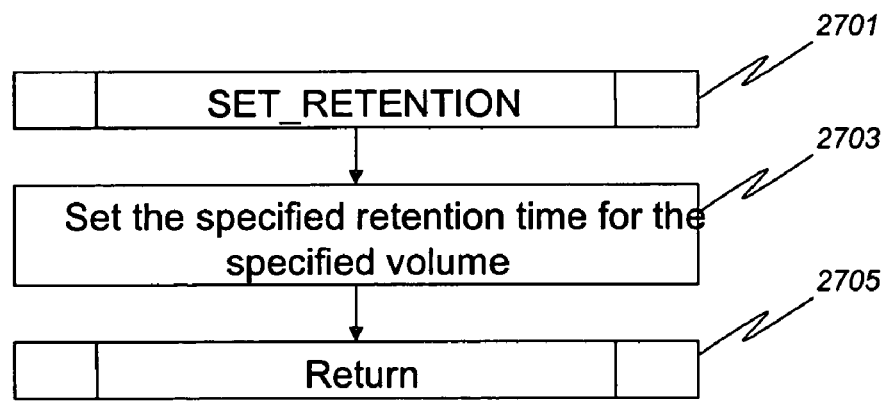
FIG. 14 is a flowchart illustrating the steps executed to perform a Set Retention Request according to the present invention.

FIG. 14 illustrates the details of the SET_RETENTION_REQUEST request (Step 0921). As illustrated in FIG. 14 the SWFS sets specified retention period information for the specified data volume into retention period table (29). The NFS/CIFS server or management software tool specifies retention period for each data volume or each file system. In a case of a file system, the SWFS sets retention period information for all of data volumes that have been allocated to the specified file system (Step 2703). Thereafter the request returns to Step 0903 (Step 2705).

Figure 17:
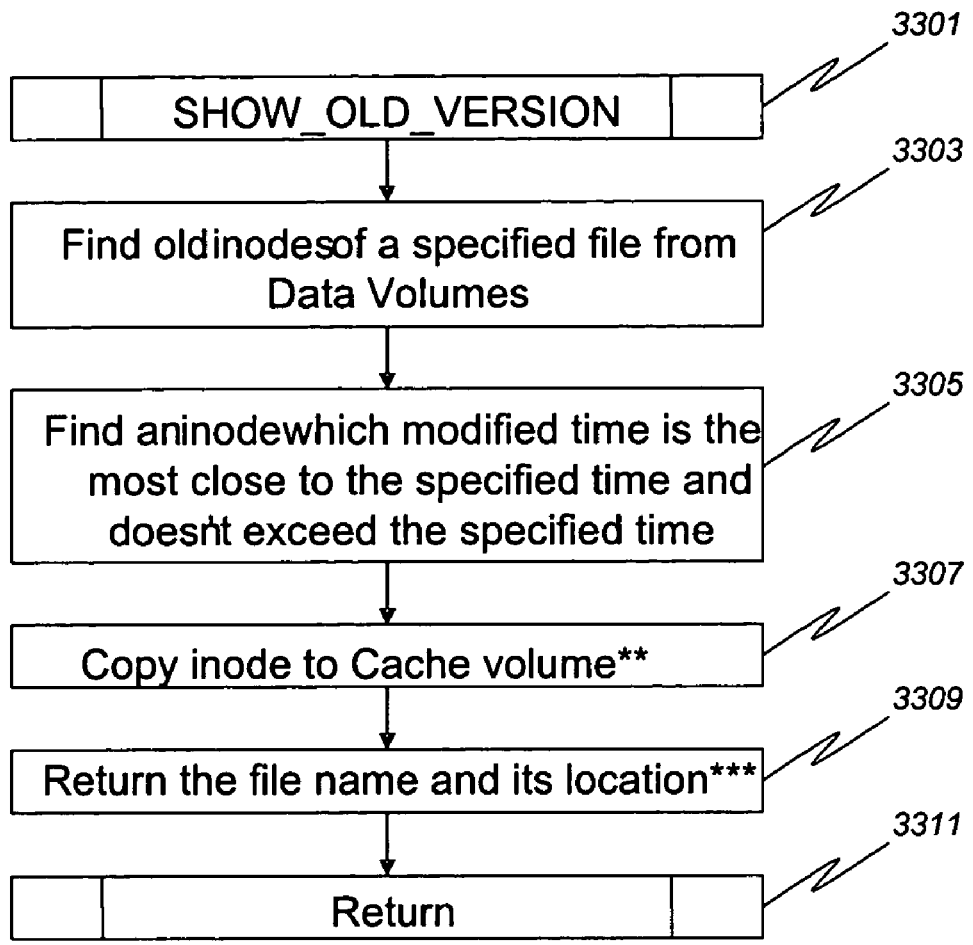
FIG. 17 is a flowchart illustrating the steps executed to perform a Show Old Version Request according to the present invention.

FIG. 17 illustrates the details of the SHOW_OLD_VERSION request (Step 0923). As illustrated in FIG. 17 the SWFS looks (attempts to find) for all old inodes for the specified file from data volumes (Step 3303). Even if a file was modified many times or deleted, all versions of the file and their inodes are still kept in data volumes. To accelerate inode search, the SWFS can store a list of inodes and their locations in a data volume at the end of the data volume as illustrated in FIG. 16. Because it is enough for the SWFS to search only inode lists of data volumes, the inode search finishes faster than searching the entire data volume. In the example illustrated in FIG. 16, the data volume 3101 has 4 files, File A (older version) 3103, File B 3107, File A (newer version) 3111 and File C 3115. There is an inode 3105, 3109, 3113, and 3117 for each file. The Inode list 3119 at the bottom of the data volume indicates the locations of the inodes in the data volume. The SWFS keeps a space in each data volume to store the inode list. The SWFS finds an inode for which the last modified time is the closest to the time specified by NFS/CIFS server or management software tool and for which the last modified time does not exceed the specified time (Step 3035). There are many ways to specify files which users want to access. Specifying a file name and time is one example. The following is an example of a SHOW_OLD_VERSION interface:

```
(Case 1) show_old_version ([INPUT]file_name, [INPUT]time,
    [OUTPUT]result)
        file_name: a name of a file
        time: time at which the specified file was
        result: a path name of the file
```

The following APIs are another way to specify files:

```
(Case 2) show_old_version ([INPUT]directory_name, [INPUT]time,
    [OUTPUT]result)
        directory_name: a name of a directory
        time: time at which the specified directory and any files and sub
    directories under the directory was
        result: a path name of the directory. All of files and subdirectories in
    the directory at the specified time are copied to Cache Volume.
(Case 3) show_old_version ([INPUT] name, [OUTPUT]result)
        name: a name of a file or a directory
        result: all versions of a specified file or a directory
```

The SWFS copies a file pointed to by the inode from a data volume to a cache volume (Step 3307). Alternatively the inode in the cache can be set to point to the data volume so as to avoid this copying operation which could be time consuming. Copying a file to a cache volume is not necessary. The NFS/CIFS server can access to the file stored in the data volume directory. The SWFS returns a file name and its location in the cache volume to the NFS/CIFS server or management software tool (Step 3309). Alternatively the user can specify a file name. Thereafter the request returns to Step 0903 (Step 3311).

There is another timing to set write-protection for data volume. In the above, the timing is the time when the data volume is filled by files. Another way is time-based. The SWFS marks when the first file is stored in the data volume and if a specified time has been passed from mark, then the SWFS sets write-protection for the data volume and uses a new data volume. Sometimes, the data volume isn't filled by files for a long time, thus time-based write-protection is effective.

Because SWFS writes data sequentially to data volumes without any data modification, it is possible to combine pointer-based LDEV guard function with SWFS. Pointer-based LDEV guard protects a part in data volumes. The part begins from the first disk block of the data volume and ends the disk block specified by a pointer. The pointer moves to a next disk block if data was written to the disk block specified by the pointer. It is important to note that the retention period can be set for each data volume or for each file system.

By use of the above described features of the present invention various NAS system configurations can be provided. These various NAS system configurations are described as follows.

A NAS system stores files to a data volume, stores updated files to an un-used area in the data volume, and keeps original files and its associated meta data. The NAS system as described above can also write-protect the data volume if the volume is full of files and write-protect the data volume by using a function of a storage system under the NAS system.

The NAS system can also write files to the data volume from the beginning of the data volume to the end of the data volume sequentially and can write-protect a disk block when data was stored in the disk block. In addition the NAS system can write-protect the data volume at the timing of when a specific time has been passed from the time at which the first file was created in the data volume and store a modified file in a cache volume until the file is closed. Once the modified file has been stored the stored modified file is moved from the cache volume to the data volume after the file was closed. In addition the locations of a file in the cache volume and the data volume are kept by using a meta data associated with the file. When the NAS system write-protects a data volume that is full, If the data volume was filled by files and meta data, then a new data volume is allocated to a file system.

The NAS system can indicate older versions of files and directories in data volumes and can indicate selected versions of files and directories by specifying names of files, names of directories or time. When the NAS system write-protects a data volume that is full, a retention period is set for each data volume and each file system. Thereafter, the NAS system can un-protect data volumes and file systems, if their retention periods have expired.

When the NAS system indicates older versions of files and directories in data volumes, older versions of files can be copied to cache volume and access to the files can be provided for users. In addition the NAS system keeps a list of locations of inodes in a data volume in a specific area in the data volume.

The NAS system as described above in the various configurations includes a NAS controller which processes file level input/output (I/O) requests and controls the NAS system, and a storage apparatus having a controller and a storage device upon which a plurality of volumes for storing data are represented. The controller controls the storage device.

Thus, according to the present invention when at least a portion of data stored on a volume included in the at least one volume is updated, the updated data is stored to an unused area of the volume, information is stored on the volume indicating that the updated data corresponding to original data stored in an original area is stored in the unused area so that subsequent accesses to the original of the updated data is directed to the updated data stored in the unused area, and the original of the updated data is retained in the original area. Therefore, by use of the present invention long term data archiving of the original of the updated data is implemented.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A Network Attached Storage (NAS) system for implementing long term data archiving comprising:
  a NAS controller which processes file level input/output (I/O) requests and controls said NAS system; and
  a storage apparatus having a controller and multiple disk drives, controlled by said controller and configured in a RAID (redundant array of independent disks) configuration having multiple volumes for storing data and providing RAID protection for said volumes, said volumes including at least one cache volume allocated on said disk drives in said RAID configuration and one or more data volumes allocated on said disk drives in said RAID configuration;
  wherein an original inode is provided for a file stored on a first data volume of said data volumes,
  wherein when the file is opened and at least a portion of data of the file stored on the first data volume is updated to create updated data, the updated data is stored to said cache volume, and a modified mode is created representing a status of the updated data as being stored in the cache volume,
  wherein when said file is requested to be closed, the updated data is stored in a sequential manner to an unused area of said first data volume and the modified mode is stored on said first data volume and updated to indicate that the undated data corresponding to original data stored in an original area is stored in said unused area so that a subsequent access to the original data is directed to the updated data stored in said unused area to access an undated version of said file,
  wherein the original data is retained in said original area, and the original mode is retained, thereby implementing long term data archiving of the original data so that the original file is accessible,
  wherein a list of inodes is stored at the end of said first data volume.
  wherein the list of inodes includes said original inode, said modified inode, and the locations of the original inode and modified inode in the first data volume,
  wherein said NAS system receives said file level I/O requests from servers through a network connected between said servers and said NAS system,
  wherein each of said servers executes application programs and includes a Common Interface File System (CIFS) or a Network File System (NFS) sitting under a Virtual File System (VFS) layer of an operating system of each server, providing the application programs file level access to said NAS system via said network,
  wherein said NAS controller comprises:
  a NFS/CIFS server for processing NFS or CIFS file I/O requests; and
  a Sequential Write File System (SWFS), sitting under a VFS layer of an operating system of said NAS controller, managing files requested by file I/O requests that have been processed by said NFS/CIFS server,
  wherein said SWFS, upon receipt of a file I/O request processed by said NFS/CIFS server, determines whether said file I/O request is one of a FILE_OPEN request, wherein a specified file is opened, a FILE_CLOSE request, wherein a specified file is closed, a FILE_READ request, wherein data is read from a specified file, a FILE_WRITE request wherein data is written to a specified file, a FILE_DELETE request, wherein a specified file is deleted, a FILE_CREATE request, wherein a file is created, a CHANGE_ATTRIBUE request, wherein basic information in an inode of a specified file is changed, a SET_RETENTION request, wherein a retention period is set to a specified file system, and a SHOW_OLD_VERSION request, wherein older versions of a specified file are provided, wherein when said file I/O request is a FILE_CLOSE request, said SWFS allocates a sufficient number of un-used disk blocks in the first data volume to store the updated data located in the cache volume to the first data volume, said SWFS copies the updated data stored in the cache volume and pointed to by the modified inode to the allocated disk blocks in the first data volume, modifies data allocation information of the modified inode so that the modified inode points to the un-used disk blocks in the first data volume, allocates a sufficient number of un-used disk blocks in the first data volume to store the modified inode, and said SWFS writes the modified inode to the allocated disk blocks in the first data volume.

2. The NAS system according to claim 1, wherein following a determination that there is not a sufficient number of un-used disk blocks in the first data volume, the first data volume is protected, a retention period is set, and a new data volume is allocated to which the updated data and the modified inode are stored.

3. The NAS system according to claim 1, wherein said SWFS manages files by:
   (a) never overwriting a file stored in a data volume once the file is written to the data volume;
   (b) keeping the original file in the data volume and writing a modified version of said file to an unused location in the data volume;
   (c) writing data from a first offset of a data volume to a last offset sequentially;
   (d) upon the data volume becoming filled with data, write-protecting the data volume and using another data volume to write another data or updated data; and
   (e) when a retention period set to a data volume has expired, allowing a user to decide whether to keep or delete files stored in the data volume.

4. The NAS system according to claim 3, wherein according to (d) the data volume is write-protected using a Write Once Read Many (WORM) Application Program Interface (API).

5. The NAS system according to claim 1, wherein each said inode includes basic information about its respective file and data allocation information of the respective file,
   wherein said basic information includes at least information identifying the inode, the size of the respective file and a time at which the file was last modified,
   wherein said first data volume is divided into a plurality of disk blocks, and wherein said data allocation information includes at least information identifying the disk blocks in the first data volume to which the respective file is stored.

6. The NAS system according to claim 5, wherein the modified inode and the original inode are stored in the first data volume in a manner such that the modified inode is used to access a modified version of the file and the original inode is archived.

* * * * *